United States Patent
Luo (10) Patent No.: US 8,135,667 B2
(45) Date of Patent: Mar. 13, 2012

(54) SYSTEM, METHOD, AND COMPUTER-READABLE MEDIUM THAT FACILITATE IN-DATABASE ANALYTICS WITH SUPERVISED DATA DISCRETIZATION

(75) Inventor: Congnan Luo, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 241 days.

(21) Appl. No.: 12/651,086

(22) Filed: Dec. 31, 2009

(65) Prior Publication Data

US 2011/0161280 A1 Jun. 30, 2011

(51) Int. Cl.
*G06F 7/00* (2006.01)
(52) U.S. Cl. .................. 707/604; 707/705
(58) Field of Classification Search .............. 707/604, 707/600, 705, 999.001
See application file for complete search history.

(56) References Cited

U.S. PATENT DOCUMENTS

| | | | |
|---|---|---|---|
| 2004/0158548 A1* | 8/2004 | Boulle | 707/1 |
| 2010/0082589 A1* | 4/2010 | Mogi et al. | 707/706 |

OTHER PUBLICATIONS

David. Howell et al. "chi Square Test=Analysis of Contingency Tables".*

* cited by examiner

*Primary Examiner* — Hung T Vy
(74) *Attorney, Agent, or Firm* — Steve McDonald (57) ABSTRACT

A system, method, and computer-readable medium that facilitate in-database supervised discretisation mechanisms which improve data classification are provided. The disclosed mechanisms provide an efficient, automatic, and repeatable way to perform data discretisation without human intervention. Efficient processing of large and complex unknown data is provided that advantageously does not require the data being analyzed to be processed outside the database. The disclosed mechanisms may use an External Stored Procedure to avoid multiple joins of large tables and minimize the number of full table scans and, consequently, provide better performance than contemporary mechanisms. The disclosed system produces intermediate results in tables which may be conveyed to a visualization subsystem thereby providing users a better understanding of the data distribution in each category. Further, the disclosed system and method introduce a novel similarity-based solution to merge intervals when chi-square testing is not reliable and thereby improves the quality of the interval merge process.

20 Claims, 10 Drawing Sheets

| | Value (720a) | Plan (720b) | Frequency (720c) |
|---|---|---|---|
| 710a | 12020 | A | 2 |
| 710b | 12024 | A | 3 |
| 710c | 12024 | C | 1 |
| 710d | 12211 | A | 4 |
| 710e | 12230 | A | 17 |
| 710f | 12230 | B | 2 |
| 710g | 12235 | C | 1 |
| 710h | 12240 | A | 2 |

| | Value (820a) | FreqA (820b) | FreqB (820c) | FreqC (820d) |
|---|---|---|---|---|
| 810a | 12020 | 2 | 0 | 0 |
| 810b | 12024 | 3 | 0 | 1 |
| 810c | 12211 | 4 | 0 | 0 |
| 810d | 12230 | 17 | 2 | 0 |
| 810e | 12235 | 0 | 0 | 1 |

| Merge | Interval (920a) | MinVal (920b) | MaxVal (920c) | FreqA (920d) | FreqB (920e) | FreqC (920f) |
|---|---|---|---|---|---|---|
| 910a | 1 | 0 | 23300 | 14364 | 98 | 211 |
| 910b | 2 | 23300 | 56037 | 264 | 530 | 78980 |
| 910c | 3 | 56037 | 98940 | 32 | 421765 | 1357 |
| 910d | 4 | 98940 | 120650 | 147 | 218 | 23981 |
| 910e | 5 | 120650 | 9999999 | 22359 | 69 | 419 |

920

| | 1020a | 1020b | 1020c |
|---|---|---|---|
| Discrete | Customer_Number | Income | Plan |
| 1010a | 01001 | 1 | A |
| 1010b | 01002 | 1 | B |
| 1010c | 01003 | 5 | A |
| 1010d | 01004 | 1 | A |
| 1010e | 01005 | 5 | A |
| 1010f | 01006 | 1 | A |
| 1010g | 01007 | 1 | A |
| 1010h | 01008 | 5 | B |
| 1010i | 01009 | 1 | B |
| 1010j | 01010 | 5 | A |
| 1010k | 01011 | 5 | C |
| 1010l | 01012 | 3 | B |

SYSTEM, METHOD, AND COMPUTER-READABLE MEDIUM THAT FACILITATE IN-DATABASE ANALYTICS WITH SUPERVISED DATA DISCRETIZATION

BACKGROUND

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One of the goals of a database management system is to optimize the performance of queries for access and manipulation of data stored in the database. Given a target environment, an optimal query plan is selected, with the optimal query plan being the one with the lowest cost, e.g., response time, CPU processing, I/O processing, network processing, as determined by an optimizer. The response time is the amount of time it takes to complete the execution of a query on a given system. In this context, a "workload" is a set of requests, which may include queries or utilities, such as loads, that have some common characteristics, such as application, source of request, type of query, priority, response time goals, etc.

Classification is a powerful database analytics tool that provides businesses with insight into its trends and behaviors. In general, discretization is a technique to partition continuous numeric data into intervals, and transform the numeric data to discrete or nominal data. Since this transformation significantly reduces the cardinality of the data, it is often used in data preparation for many classification tasks, such as Decision Tree and Naïve Bays. It has been reported in many literatures that training a classification model on discrete data can be orders faster than training it on the original numeric data. Discretization may also improve classification accuracy and enhance the understandability of the classification rules extracted from the model.

Discretization methods fall into two groups, unsupervised and supervised. DBMS vendors generally implement only unsupervised algorithms, such as equal-width-intervals, equal-frequency-intervals, and/or their variations, e.g., bin coding. Unfortunately, bin coding has no way to find the optimal boundaries automatically because it doesn't utilize the label information to merge or split intervals. In practice, bin coding relies on a human-specified parameter, such as interval width, or requires a manual interval adjustment to determine interval boundaries. This typically presents problems for processing large complex data. The width of intervals varies, so a fixed interval is inappropriate. In addition, intervals may have multiple mode frequencies. Consequently, it is often quite difficult to identify an optimized parameter or interval adjustments by human.

SUMMARY

Disclosed embodiments provide a system, method, and computer readable medium for in-database supervised discretization mechanisms which improve data classification. The disclosed mechanisms provide an efficient, automatic, and repeatable way to perform data discretization. Advantageously, human intervention is minimized. Efficient processing of large and complex unknown data is provided that advantageously does not require the data being analyzed to be processed outside the database. The disclosed mechanisms may use an External Stored Procedure to avoid multiple joins of large tables and minimize the number of full table scans and, consequently, provide better performance than contemporary mechanisms. The disclosed system produces intermediate results in tables which may be conveyed to a visualization subsystem thereby providing users a better understanding of the data distribution in each category. Further, the disclosed system and method introduce a novel similarity-based solution to merge intervals when chi-square testing is not reliable and thereby improves the quality of the interval merge process.

BRIEF DESCRIPTION OF THE DRAWINGS

Aspects of the present disclosure are best understood from the following detailed description when read with the accompanying figures, in which.

DETAILED DESCRIPTION

It is to be understood that the following disclosure provides many different embodiments or examples for implementing different features of various embodiments. Specific examples of components and arrangements are described below to simplify the present disclosure. These are, of course, merely examples and are not intended to be limiting.

In accordance with disclosed embodiments, an in-database supervised discretization algorithm is provided which facilitates improved classification. The discretization algorithm uses the data itself to determine each interval automatically. An SQL based in-database supervised discretization algorithm is utilized where an aggregate function and External Stored Procedure (XSP) are used to calculate a contingency table and merge intervals with chi-square testing. Merge intervals are based on similarity when the chi-square test condition is not satisfied.

Figure 1:
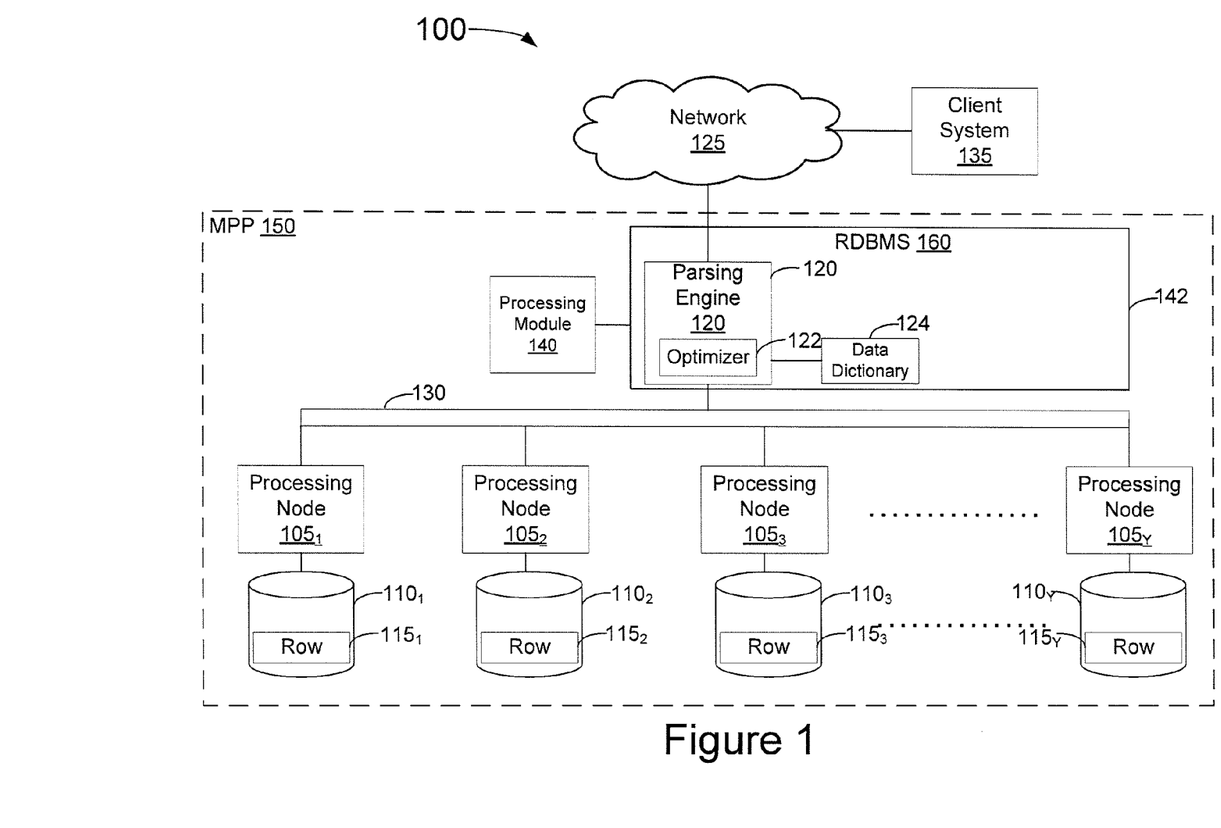
FIG. 1 depicts a diagrammatic representation of an exemplary architecture for a large database system that is suited for implementing mechanisms for In-Database analytics with supervised data discretization in accordance with disclosed embodiments.

FIG. 1 depicts a diagrammatic representation of an exemplary architecture for a large database system 100, such as a Teradata Active Data Warehousing System, that is suited for implementing mechanisms for In-Database analytics with supervised data discretization in accordance with disclosed embodiments. The database system 100 includes a relational database management system (RDBMS) 160 built upon a massively parallel processing (MPP) system 150.

As shown, the database system 100 includes one or more processing nodes $105_{1 \ldots Y}$ that manage the storage and retrieval of data in data-storage facilities $110_{1 \ldots Y}$. Each of the processing nodes may host one or more physical or virtual processing modules, such as one or more access module processors (AMPs). Each of the processing nodes $105_{1 \ldots Y}$ manages a portion of a database that is stored in a corresponding one of the data-storage facilities $110_{1 \ldots Y}$. Each of the data-storage facilities $110_{1 \ldots Y}$ includes one or more disk drives or other storage medium.

The system stores data in one or more tables in the data-storage facilities $110_{1 \ldots Y}$. The rows $115_{1 \ldots Y}$ of the tables are stored across multiple data-storage facilities $110_{1 \ldots Y}$ to ensure that the system workload is distributed evenly across the processing nodes $105_{1 \ldots Y}$. A parsing engine 120 organizes the storage of data and the distribution of table rows $115_{1 \ldots Y}$ among the processing nodes $105_{1 \ldots Y}$ and accesses processing nodes $105_{1 \ldots Y}$ via an interconnect 130. The parsing engine 120 also coordinates the retrieval of data from the data-storage facilities $110_{1 \ldots Y}$ in response to queries received from a user, such as one at a client computer system 135 connected to the database system 100 through a network 125 connection. The parsing engine 120, on receiving an incoming database query, applies an optimizer 122 component to the query to assess the best plan for execution of the query. Selecting the optimal query-execution plan includes, among other things, identifying which of the processing nodes $105_{1 \ldots Y}$ are involved in executing the query and which database tables are involved in the query, as well as choosing which data-manipulation techniques will serve best in satisfying the conditions of the query. To this end, the parser and/or optimizer may access a data dictionary 124 that specifies the organization, contents, and conventions of one or more databases. For example, the data dictionary 124 may specify the names and descriptions of various tables maintained by the MPP system 150 as well as fields of each database. Further, the data dictionary 124 may specify the type, length, and/or other various characteristics of the stored tables. The database system typically receives queries in a standard format, such as the Structured Query Language (SQL) put forth by the American National Standards Institute (ANSI).

Figure 2:
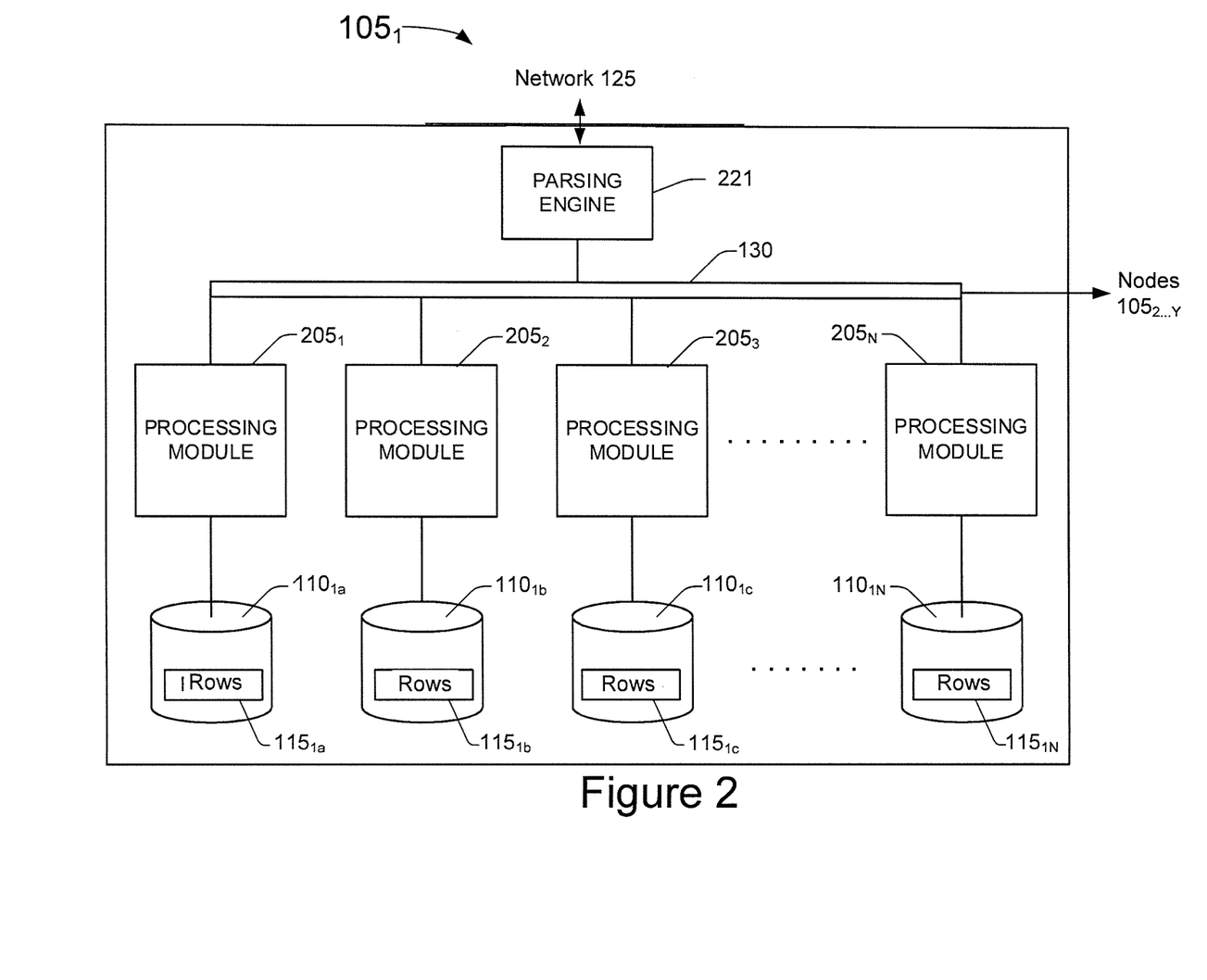
FIG. 2 depicts a diagrammatic representation of a sample architecture for one node of the database system depicted in FIG. 1.

FIG. 2 depicts a diagrammatic representation of a sample architecture for one node $105_1$ of the DBS 100. The DBS node $105_1$ includes one or more processing modules $205_{1 \ldots N}$ connected by an interconnect 130 that manage the storage and retrieval of data in data-storage facilities $110_{1a \ldots 1N}$. Each of the processing modules $205_{1 \ldots N}$ may be one or more physical processors or each may be a virtual processor, e.g., an AMP, with one or more virtual processors running on one or more physical processors. For the case in which one or more virtual processors are running on a single physical processor, the single physical processor swaps between the set of N virtual processors. For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $205_{1 \ldots N}$ manages a portion of a database that is stored in a corresponding one of the data-storage facilities $110_{1a \ldots 1N}$. Each of the data-storage facilities $110_{1a \ldots 1N}$ includes one or more disk drives. The DBS may include multiple nodes $105_{2 \ldots Y}$ in addition to the illustrated node $105_1$, connected by way of the interconnect 130.

The system stores data in one or more tables in the data-storage facilities $110_{1a \ldots 1N}$. The rows $115_{1a \ldots 1N}$ of the tables are stored across multiple data-storage facilities $110_{1a \ldots 1N}$ to ensure that the system workload is distributed evenly across the processing modules $205_{1 \ldots N}$. A parsing engine 221 organizes the storage of data and the distribution of table rows $115_{1a \ldots 1N}$ among the processing modules $205_{1 \ldots N}$. The parsing engine 221 also coordinates the retrieval of data from the data-storage facilities $110_{1a \ldots 1N}$ in response to queries received from a user at a client computer system 135. The DBS 100 usually receives queries and commands to build tables in a standard format, such as SQL.

In one implementation, the rows $115_{1a \ldots 1N}$ are distributed across the data-storage facilities $110_{1a \ldots 1N}$ by the parsing engine 221 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to data-storage facilities $110_{1a \ldots 1N}$ and associated processing modules $205_{1 \ldots N}$ by a hash bucket map. The characteristics of the columns chosen for the primary index determine how evenly the rows are distributed.

Figure 3:
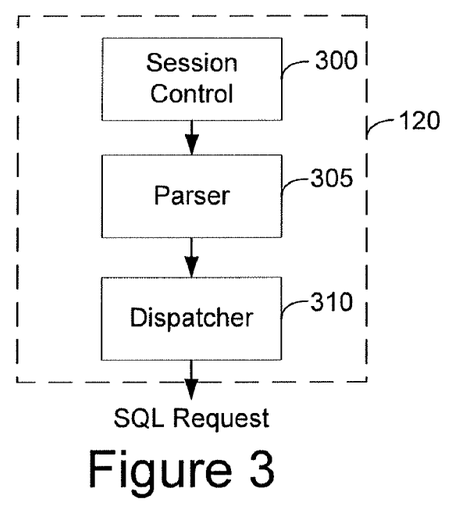
FIG. 3 is a diagrammatic representation of a parsing engine implemented in accordance with an embodiment.
Figure 4:
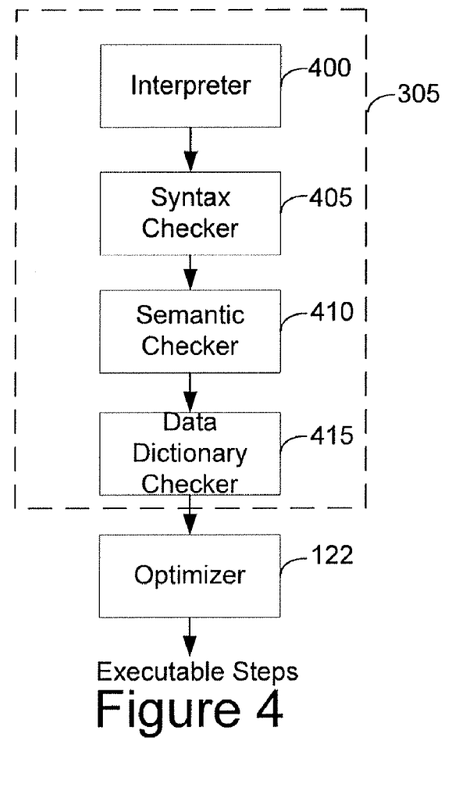
FIG. 4 is a diagrammatic representation of a parser implemented in accordance with an embodiment.

In one example system, a parsing engine, such as the parsing engine 120 or parsing engine 221, is made up of three components: a session control 300, a parser 305, and a dispatcher 310 as shown in FIG. 3. The session control 300 provides the logon and logoff functions. It accepts a request for authorization to access the database, verifies it, and then either allows or disallows the access. Once the session control 300 allows a session to begin, a user may submit a SQL request that is routed to the parser 305. As illustrated in FIG. 4, the parser 305 interprets the SQL request (block 400), checks the request for correct SQL syntax (block 405), evaluates the request semantically (block 410), and consults a data dictionary to ensure that all of the objects specified in the SQL request exist and that the user has the authority to perform the request (block 415). Finally, the parser 305 runs the optimizer 122 that selects the least expensive plan to perform the request, which provides the SQL request to the dispatcher 310 for distribution of the request for processing.

The database system described herein provides an in-database supervised discretization algorithm which improves classification mechanisms. As an example, consider an insurance company that is training a Decision Tree on its historic data. When a new customer inquires about health plans, the Decision Tree is used to categorize the customer into a predefined customer group and then predict which plan may attract the customer the most. In the data, a numeric table column, income, may have too many distinct values which cause the training to progress very slowly. To improve the performance, this column may be discretized.

Figure 5:
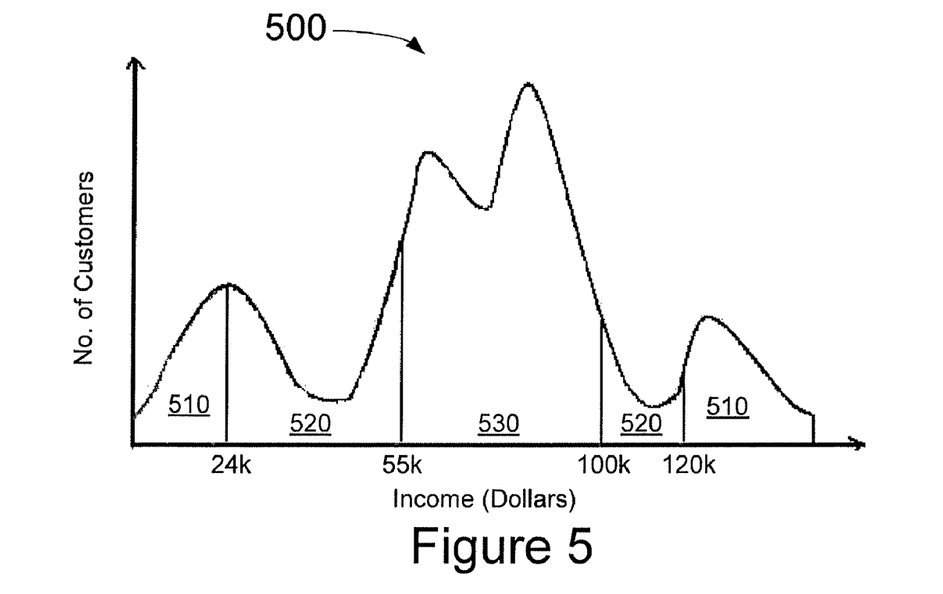
FIG. 5 depicts an exemplary chart of data that may be discretized in accordance with disclosed embodiments.

FIG. 5 depicts a chart 500 of a number of customers and corresponding income, and a plan selected by the customers. In the illustrative example, the customers may have elected one of three plans (plan "A" 510, plan "B" 520, and plan "C" 530). The depicted plans 510-530 show the most dominant plan elected for customers of the corresponding income interval. Thus, for example, the most common plan selected by customers having an income between twenty-four and fifty-five thousand is the plan B 520. Since income is just one of many factors affecting a customer's decision, each interval may contain some people with different elections. In accordance with disclosed embodiments, discretization mechanisms may, in the illustrative example, locate income interval boundaries of approximately twenty-four thousand, fifty-five thousand, one-hundred thousand, and one-hundred and twenty-thousand based on the customer income and elected plans. Advantageously, the disclosed discretization mechanisms not only minimize the information loss, but also achieve the least number of intervals.

Disclosed embodiments facilitate interval identification based on the data itself. Further, the disclosed embodiments provide an SQL based in-database supervised discretization algorithm where an aggregate function and an External Stored Procedure (XSP) are used to calculate a contingency table and merge intervals with, for example, chi-square testing. Further, the intervals are merged based on similarity when a chi-square testing condition is not satisfied.

Figure 6:
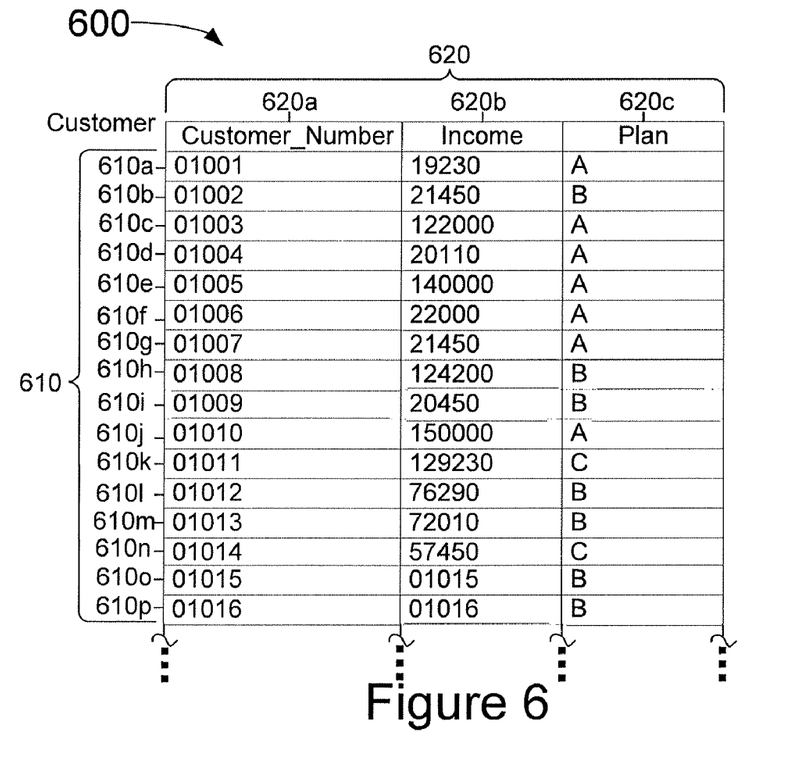
FIG. 6 is a diagrammatic representation of a portion of an exemplary base table on which discretization mechanisms may be implemented in accordance with disclosed embodiments.

FIG. 6 is a diagrammatic representation of a portion of an exemplary base table 600 on which discretization mechanisms may be implemented in accordance with disclosed embodiments. Table 600 comprises a plurality of records 610a-610p (collectively referred to as records 610) and fields 620a-620c (collectively referred to as fields 620). Each record 610 comprises data elements, or attributes, in respective fields 620. In the present example, table 600 has a table name "Customer" and includes fields 620 having respective labels of "Customer_Number," "Income," and "Plan".

The discretization mechanisms begin with initial intervals where each interval contains only one distinct value. Subsequently, chi-square, or other suitable, testing is repeatedly performed on adjacent intervals, and pairs of intervals with the smallest chi-square value are merged. As is understood, the chi-square distribution is a widely used theoretical probability distribution in inferential statistics. Chi-square testing is useful because, in general, easily calculated quantities can be proven to have distributions that approximate to the chi-square distribution if a null hypothesis is true.

The smallest chi-square between rows implies the least dependence between value and category, and thus the rows are good candidates for a merge (or the similarity-based merge is performed if the chi-square testing is un-reliable).

In the present example, exemplary historic insurance data of table 600 includes customer numbers (Customer_Number) in field 620a, income in field 620b, and an elected plan in field 620c. Further, table 600 may include any variety of historic data, such as customer gender, age, family size, occupation, working years, and the like. In an embodiment, distinct numeric values in the income field 620b may be discretized for efficient training, for example, of a Decision Tree.

Figure 7:
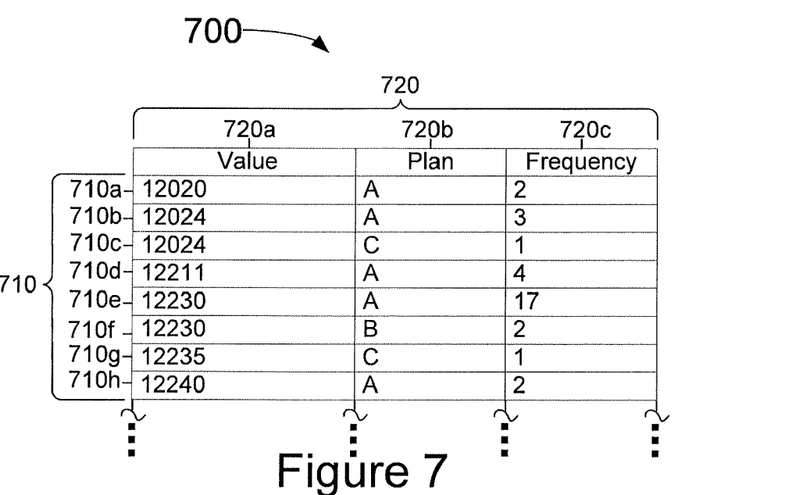
FIG. 7 depicts a diagrammatic representation of a portion of a summary table that may be derived from the base table depicted in FIG. 6 in accordance with an embodiment.

A summary table may be generated from the base table 600 in accordance with an embodiment. FIG. 7 depicts a diagrammatic representation of a portion of a Summary table 700 that may be derived from the base table 600 in accordance with an embodiment. The Summary table 700 may be generated, for example, by the following SQL statement:

```
INSERT INTO Summary VALUES (Value, Plan, Frequency)
SELECT Income, Plan, count(*)
GROUP BY (Income, Plan)
ORDER BY (Income, Plan);
```

In the present example, table 700 comprises a plurality of records 710a-710h (collectively referred to as records 710) and fields 720a-720c (collectively referred to as fields 720). Each record 710 comprises data elements, or attributes, in respective fields 720. In the present example, table 700 includes fields 720 having respective labels of "Value," "Plan," and "Frequency". Records 710 of table 700 are populated by aggregating rows of table 600 on Income field 620b and Plan field 620c. Particularly, the income value of a row is read from the base table 600 field 620b along with the corresponding plan value of field 620c. If a row already exists in the Summary table 700 with the income and plan values read from the base table rows, the frequency value of field 720c of the corresponding Summary table 700 row is incremented. If no row exists in the Summary table 700 with the income and plan values read from the base table 600 row, a row is inserted in the Summary table 700 with the income and plan values read from the base table 600, and the frequency value of the Summary table row is set to "1." This procedure is repeated for each row of the base table 600. Accordingly, when the base table 600 has been fully scanned, the Summary table 700 has a row for each income and plan pair identified in the base table 600 and a corresponding frequency value that specifies the number of rows of the base table having the income and plan value pair.

Figure 8:
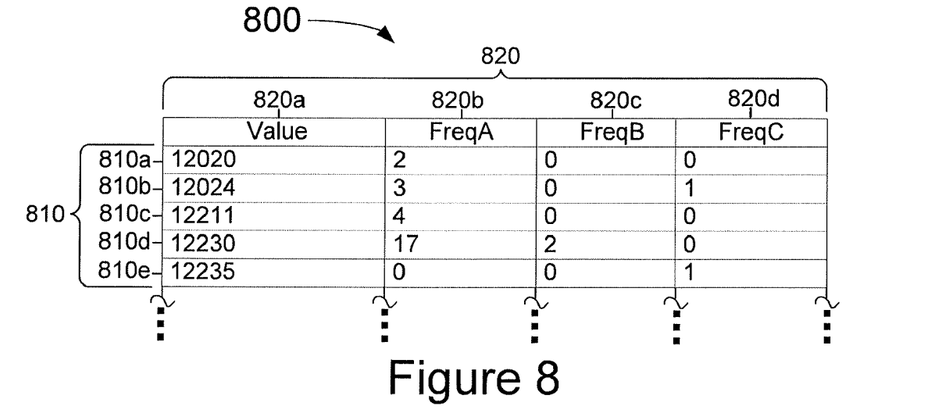
FIG. 8 depicts a diagrammatic representation of a contingency table generated in accordance with disclosed embodiments.

Next, a Contingency table 800 is generated as depicted in FIG. 8 in accordance with an embodiment. In the illustrative example, assume a customer may select a plan of "A," "B," or "C." Accordingly, the Contingency table 800 includes fields of Value 820a corresponding to the Value field 720a of the Summary table 700, and frequency fields including FreqA field 820b, FreqB field 820c, and FreqC field 820d. An External Store Procedure (XSP), for example, may scan each row of the Summary table 700 to build rows for the Contingency table 800. The XSP retrieves rows from the summary table 700, e.g., on the increasing order of the Summary table 700 value field 720a, groups all the rows based on distinct values of the value field 720a, and extracts the frequencies of the value field 720a against a specified category, e.g., values of the plan field 720b. After a group is completed, a new row, which includes all the frequencies of an income value, is inserted into the Contingency table 800. The Contingency table 800 may be used for many statistic analysis mechanisms including chi-square testing. In this manner, when the Contingency table 800 has been completed, each row of the Contingency table 800 specifies a distinct numeric income value in field 820a and corresponding frequencies, or counts, of plans in fields 820b-820d.

Figure 9:
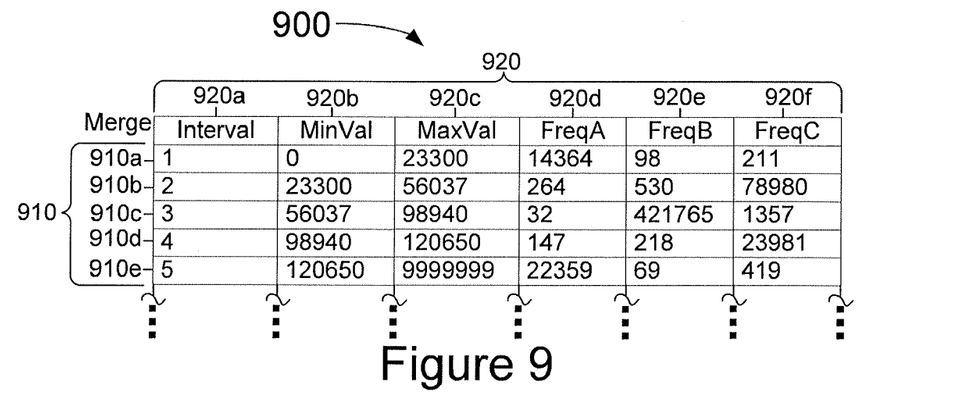
FIG. 9 depicts a diagrammatic representation of a value/interval merge table generated by a chi-square or similar mechanism in accordance with disclosed embodiments.

Upon completion of the generation of the contingency table 800, a value/interval merge table is then generated in accordance with an embodiment. FIG. 9 depicts a diagrammatic representation of an exemplary value/interval merge table 900 generated by chi-square or similar mechanisms.

The value/interval merge table 900 includes an interval field 920a for storage of an interval identifier, and minimum and maximum value fields 920b-920c that specify the minimum and maximum values of the corresponding interval. Further, the value/interval merge table 900 may include fields 920d-920f for storing a frequency count of the category, e.g., plan, elected by the customers assigned to the corresponding interval.

Upon creation of the value/interval merge table 900, an XSP, or other routine, performs the interval initialization and merge. Each initial interval is formed with only one single distinct income value. So, both of its MinVal and MaxVal specified by fields 920b and 920c are initialized to this value. In this manner, each of the intervals of the interval/merge table 900 initially correspond to one of the rows of the Contingency table 800. A chi-square routine, or other suitable algorithm, may then be invoked for the rows of the value/interval merge table 900.

For any two adjacent rows:

$Row_i$: $interval_i$, $minval_i$, $maxval_i$, $freqa_i$, $freqb_i$, $freqc_i$
$Row_{i+1}$: $interval_{i+1}$, $maxval_{i+1}$, $freqa_{i+1}$, $freqb_{i+1}$, $freqc_{i+1}$ the rows may be normalized as follows:

$Row_i$: $interval_i$, $minval_i$, $maxval_i$, norm_$freqa_i$, norm_$freqb_i$, norm_$freqc_i$
$Row_{i+1}$: $interva_{i+1}$, $minval_{i+1}$, $maxval_{i+1}$, norm_$freqa_{i+1}$, norm_$freqb_{i+1}$, norm_$freqc_{i+1}$ where norm_$freqa_k$ = $freqa_k/(freqa_k+freqb_k+freqc_k)$
norm_$freqb_k$ = $freqb_k/(freqa_k+freqb_k+freqc_k)$
norm_$freqc_k$ = $freqc_k/(freqa_k+freqb_k+freqc_k)$, An evaluation may then be made to determine if corresponding normalized frequencies of adjacent rows are within a particular percentage that specifies an allowable merge tolerance from one another. For instance, an evaluation may be made according to the following:

---

If ABS(norm_$freqa_{i+1}$ − norm_$freqa_i$) ≤ S × min(norm_$freqa_i$, norm_$freqa_{i+1}$) AND
ABS(norm_$freqb_{i+1}$ − norm_$freqb_i$) ≤ S × min(norm_$freqb_i$, norm_$freqb_{i+1}$) AND
ABS(norm_$freqc_{i+1}$ − norm_$freqc_i$) ≤ S × min(norm_$freqc_i$, norm_$freqc_{i+1}$)

--- where S specifies a percentage within which the corresponding normalized frequencies of adjacent rows are required to be within each other in order for the adjacent rows to be merged. If so, then Row, may be updated according to the following:

$Row_i$: $interval_i$, $minval_i$, $maxval_{i+1}$, $freqa_{i+1}+freqa_i$, $freqb_{i+1}+freqb_i$, $freqc_{i+1}+freqc_i$ Subsequently, Rowhd i+1 is then deleted.

A first scan of table 900 may perform the first round of merging of adjacent rows based on the above evaluation rule. This may result in the deletion of many adjacent rows with the same or closely related distribution across the categories. In many cases, there may be numerous distinct values appearing in only one common category. Thus, these rows may be merged and the number of rows of the value/interval merge table 900 may be significantly reduced.

A subsequent scan of the value/interval merge table 900 facilitates elimination of those intervals which contain too few instances where chi-square testing is not reliable. These intervals may be merged based on similarity. In this instance, rows of the value/interval merge table 900 are selected on the order of interval value, and the chi-square value is calculated for each pair of adjacent rows. If the chi-square testing of an interval with its two neighbors are all un-reliable, the row of this interval may be marked or otherwise designated as such. For a marked row, $Row_i$, in the value/interval merge table 900 and its two neighbors $Row_{i-1}$ and $Row_{i+1}$, the frequencies are normalized as described above. The cosine distance of $Row_{i-1}$ and $Row_i$ is compared with the distance of $Row_i$ and $Row_{i+1}$. Then, the two rows with a smaller cosine distance may be merged.

A third data scan of the value/interval merge table 900 may be performed for interval merging using chi-square testing. In this instance, rows are selected from the value/interval merge table 900 on the order of the row interval value, and a chi-square value is calculated for each pair of adjacent rows. The result is stored in a temporary table in which each row contains the interval values of the two rows being tested and their corresponding chi-square value. Thereafter, the temporary table is sorted on the increasing order of the chi-square values. The two intervals with the smallest chi-square value may be merged and removed from the value/interval merge table 900, and then the newly produced interval may be inserted into the value/interval merge table 900. The chi-square values of this new interval row are also compared with its neighbors. The temporary table may be updated to reflect the change. This process may be repeated until all chi-square values in the temporary table are higher than a threshold which is selected according to the chi-square distribution of a specific freedom degree. Alternatively, the procedure may stop at some user-defined termination condition. For example, the user might prefer that the final number of intervals in table 900 must be larger than an integer to avoid over-merge.

In general, chi-square testing is used in statistics to analyze the relationship between two variables to evaluate whether the value of one variable is dependent of the value of another. In the example depicted and described herein, two variables to be analyzed using chi-square testing are the income specified by field 620b, or income value ranges as described more fully hereinbelow, and the corresponding customer(s) vote for a particular plan, e.g., plan frequencies. For example, if people with income falling within a particular interval demonstrate similar behavior in voting plans, e.g., the same frequency distribution across the three plans, then they may be considered in a common group of people and thus may be merged. Alternatively, they should be kept as separate groups because their incomes do have an impact on their voting decision and make their behavior different.

In the chi-square test, it is first assumed a null hypothesis to be true, and then evaluate whether there is statistical evidence to reject it. In the present example, a null hypothesis is that the income intervals of two tested rows are independent of the distribution of their plan frequencies (e.g., across plans A, B and C). If this hypothesis is true, the people in the two income intervals will vote in similar way. Thus, the two rows may be merged. If this hypothesis is false, the two income ranges have different impact on people's decisions and the rows are not merged. Chi-square testing facilitates identifying the statistic evidence to reject the null hypothesis if it is actually false. Once the null hypothesis of the test on a pair of rows is rejected, the two rows should not be merged. If, however, it is not rejected, the two rows might be a good candidate for merging.

For the test purpose, we first calculate the chi-square value of each pair of adjacent rows in table 900 using the general chi-square equation. The equation is described as:

$$\text{Chi-square value } \chi^2 = \sum_{N}^{i=1} \frac{(O_i - E_i)^2}{E_i}$$

where N is the number of frequency cells of the two rows being tested in the contingency table, $O_i$ is the observed frequency of each frequency cell in the contingency table, e.g., the values in fields 920d, 920e, and 920f, and $E_i$ is the expected frequency of each frequency cell in the contingency table. Its value is derived from the observed values. Second, a critical chi-square value needs to be set as a basic merge threshold. The chi-square value of the pair of rows to be merged must be smaller than this threshold to pass the test. If no pair has a chi-square value smaller than this threshold in table 900, the chi-square merge procedure is terminated. Usually, a chi-square probability of less than or equal to 0.05 is commonly interpreted by statisticians as justification for rejecting a null hypothesis. It guarantees that the chance of mistakenly rejecting a null hypothesis is lower than 5%. Then, the chi-square distribution may be evaluated to find the critical value at the possibility 0.05 for a specific degree of freedom. The degree of freedom for the chi-square statistic is:

$df$=(row #−1)*(frequency column #−1).

For example, in our insurance case, df=(2−1)*(3−1)=2 because the test is performed on two adjacent rows and there are three frequency column 920d, 920e, and 920f. With this degree of freedom, the critical chi-square value 5.99 can be found from the chi-square distribution. That is to say, if the chi-square value of a pair of adjacent rows is at or larger than 5.99, the null hypothesis on the pair may be rejected with a small chance of 5% to be wrong. It implies a strong objection to merge the two rows.

It is very often that many pairs of rows in table 900 may pass the chi-square test, e.g., their null hypothesis is not rejected. That means these rows could be candidates for a merge. In such a situation, all the pairs passing the test will be put into a pool. Then, the pair of rows with the smallest chi-square value may first be selected for merging since they are more likely to actually hold the independency relationship. After the merge, the new row replaces the two old rows in the pool and the chi-square test is performed on it with its two neighbors. Then, the next pair of rows with the smallest chi-square value will be selected from the pool and merged. This procedure will be repeated until some termination condition is met, such as no pair can pass the chi-square test or the user-defined minimum number of intervals is reached.

In general, a reliable chi-square test requires a frequency in all or portion of cells of the columns 920d, 920e, and 920f of the table 900 to meet a minimum size. For example, many statisticians require five or more, while others require ten or more. If this particular requirement is not met, a similarity-based merge may be performed to increase the frequency in cells as described more fully hereinbelow.

Figure 10:
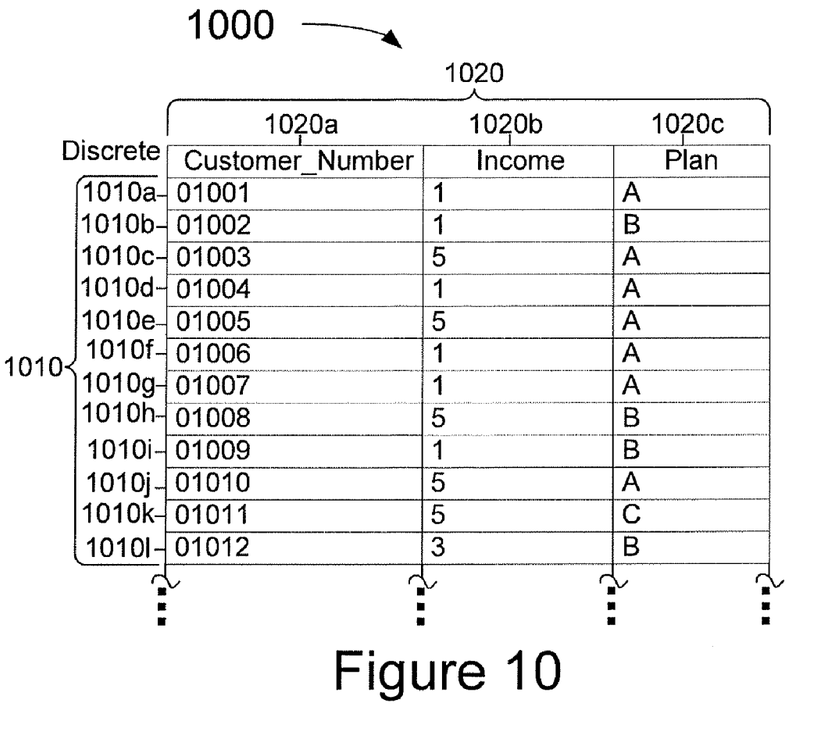
FIG. 10 depicts a diagrammatic representation of a discrete table generated in accordance with disclosed embodiments.

The numeric data to be discretized, e.g., the income data in the ongoing example, is then transformed to discrete data to generate a discrete table 1000 as depicted in FIG. 10. To this end, a row for each of the customers of the customer table 600 may be included in the Discrete table 1000, and a discrete income may be specified for the corresponding customer based on the particular interval within which the customer's income falls between the maximum and minimum income level of the interval. Thus, for example, the Discrete table 1000 may include fields of Customer_Number 1020a, Income 1020b, and Plan 1020c. The following SQL statement may be executed to populate the Discrete table 1000.

```
INSERT INTO Discrete (Customer_Number, Income, Plan)
SELECT Customer.Customer_Number, Merge.Interval, Customer.Plan
From Customer, Merge
WHERE ((Customer.Income >= Merge.MinVal) AND
       (Customer.Income < Merge.MaxVal))
```

Figure 11:
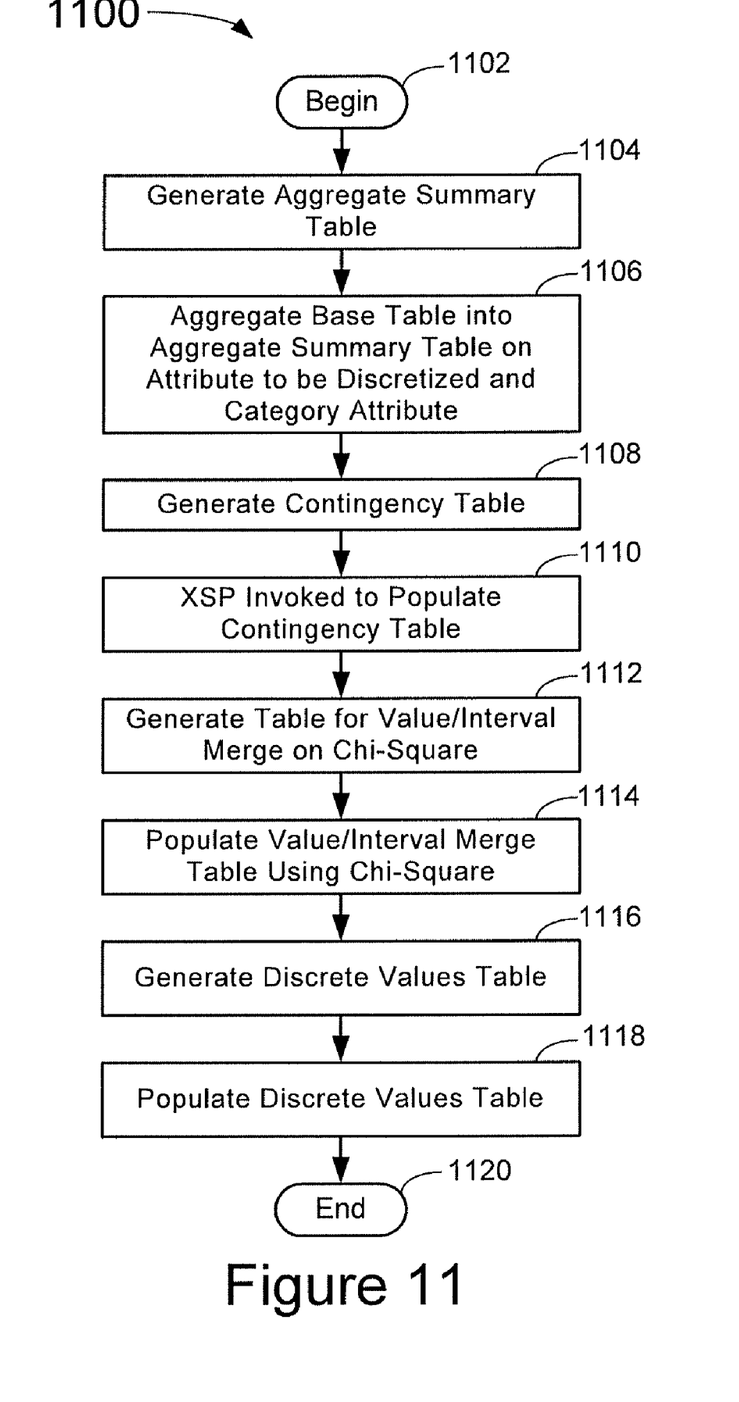
FIG. 11 is a flowchart that depicts a supervised discretization procedure for the data of a base table on an attribute to be discretized in accordance with an embodiment.

FIG. 11 is a flowchart 1100 that depicts a supervised discretization procedure for the data of a base table, e.g., table 600, on a numeric attribute in accordance with an embodiment. The processing steps of FIG. 11 may be implemented as computer-executable instructions tangibly embodied on a computer-readable medium executable by a processing system, such as one or more of the processing nodes $105_1$-$105_Y$ depicted in FIG. 1.

The supervised discretization procedure starts (step 1102). An aggregate summary table is generated (step 1104) and the aggregation routine is invoked (step 1106). For instance, assuming the discretization procedure is to be performed on the income of the customers of the base table 600 and the customer's plan selection, the aggregate Summary table 700 may be generated. The base table 600 is then aggregated into the aggregate Summary table 700 on the attribute to be discretized, e.g., income, and another attribute, e.g., the customer plan (step 1106). A contingency table, e.g., table 800, is then generated (step 1108), and an XSP procedure, or other suitable routine, is invoked to populate the contingency table (step 1110) as described more fully hereinbelow with reference to FIG. 12. A value/interval merge table, e.g., table 900, is then generated for chi-square merging of rows of the Contingency table 800 (step 1112), and the value/interval merge table is then populated using chi-square or other suitable mechanism (step 1114) as described more fully hereinbelow with reference to FIG. 13. A discrete values table, e.g., table 1000, is then generated (step 1116), and thereafter populated (step 1118). The aggregation routine cycle may then end (step 1120).

Figure 12:
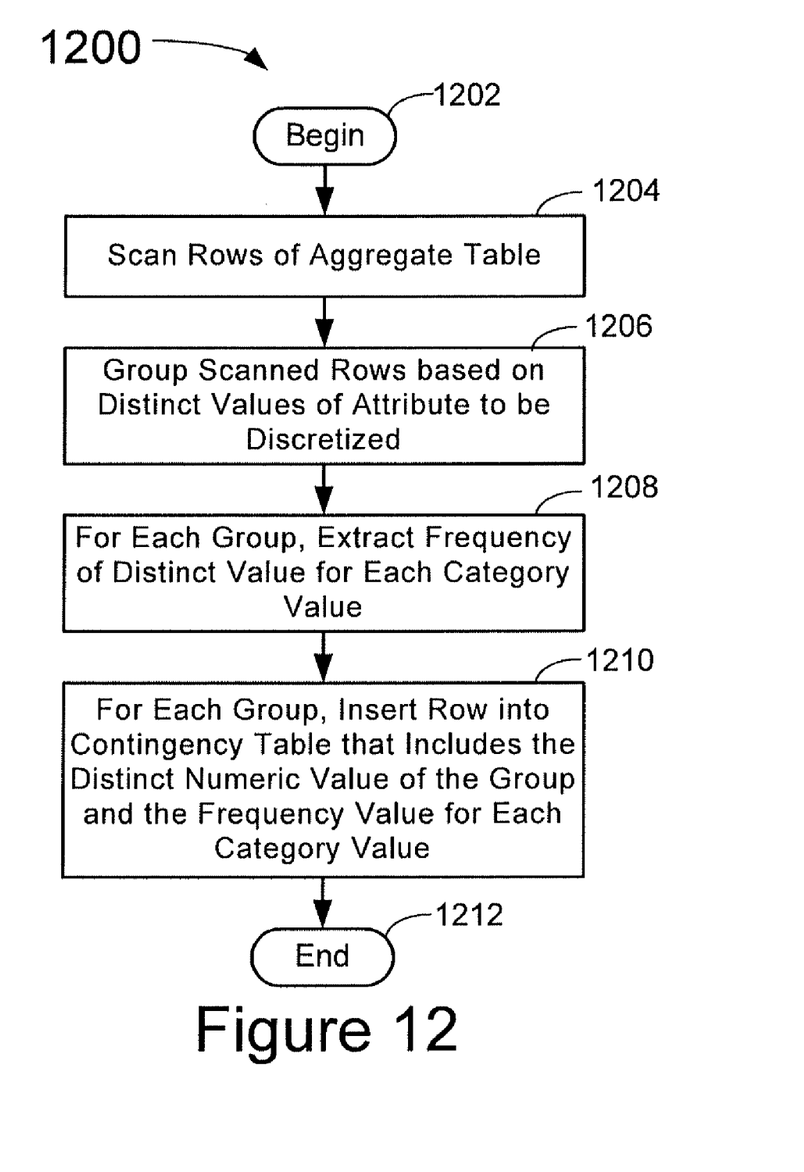
FIG. 12 is a flowchart that depicts processing of a contingency table population routine implemented in accordance with an embodiment.

FIG. 12 is a flowchart 1200 that depicts processing of a contingency table population routine implemented in accordance with an embodiment. The processing steps of FIG. 12 may be implemented as computer-executable instructions tangibly embodied on a computer-readable medium executable by a processing system, such as one or more of the processing nodes $105_1$-$105_Y$ depicted in FIG. 1.

The Contingency table 800 population routine is invoked (step 1202), e.g., at step 1110 of FIG. 11, and the rows of the Summary table, e.g., table 700, are scanned (step 1204). In an embodiment, the contingency table population routine may retrieve rows from the Summary table 700 on the increasing order of the Summary table value being discretized, e.g., the value field 720a, and then group all the rows for a distinct contingency table value on the attribute being discretized (step 1206). The frequency for the attribute value, e.g., the value of field 720a, of the grouped rows may then be extracted (step 1208) from the scanned rows. A row may then be inserted or otherwise allocated in the Contingency table 800 for each distinct numeric value of the attribute to be discretized and may include a respective column for all attributes associated with the attribute to be discretized for which a frequency is to be evaluated (step 1210). For example, each row of the Contingency table 800 may include a column, e.g., columns 820b-820d, in which the frequencies, e.g., the count, of plans of corresponding incomes recorded in the Value column 820a may be stored. In this manner, rows having a value specified in column 820a of the Contingency table 800 include associated values in columns 820b-820d that specify the count of the plans ("Plan A", "Plan B", and "Plan C"). When all rows have been scanned and accommodated in the Contingency table 800, the contingency table population routine cycle may then end (step 1212).

Figure 13A:
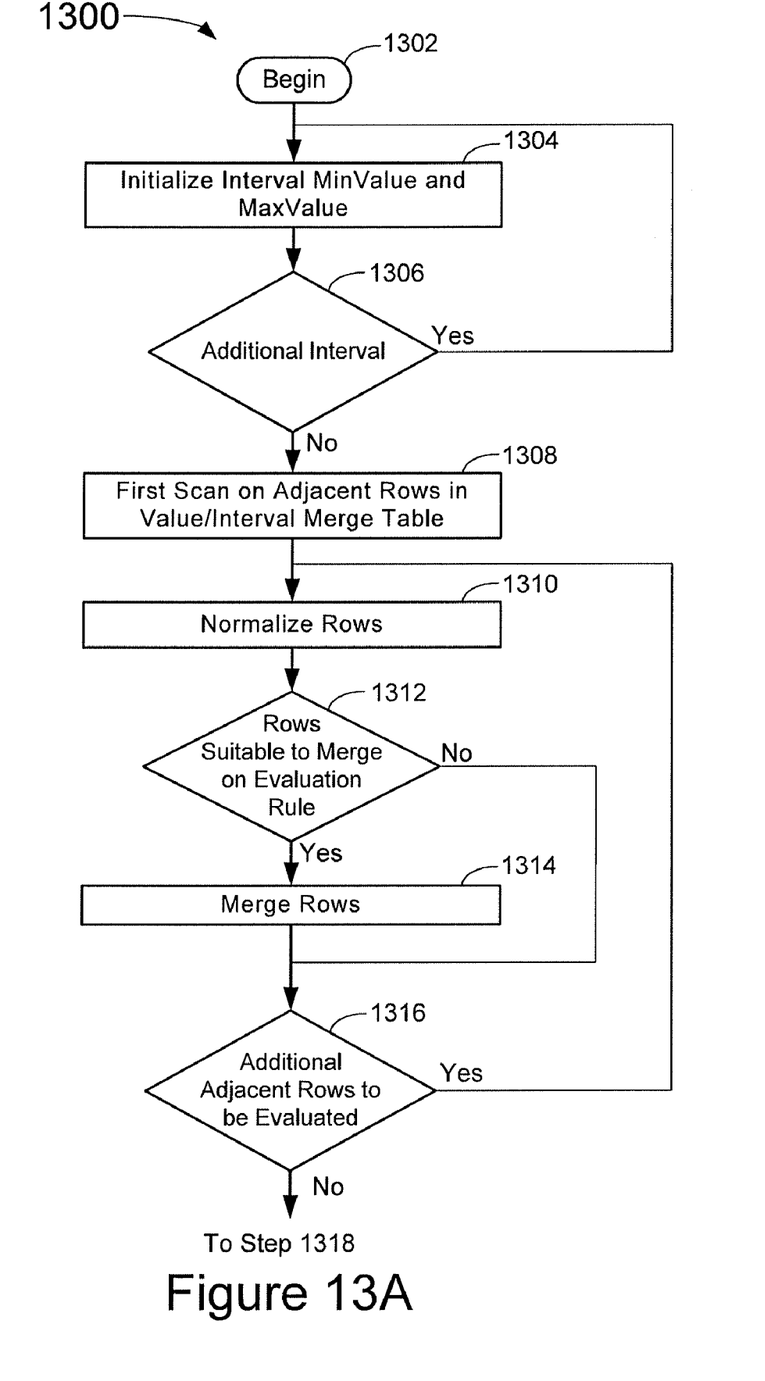
FIGS. 13A-13B depict a flowchart of processing of a value/interval merge table population routine implemented in accordance with an embodiment.
Figure 13B:
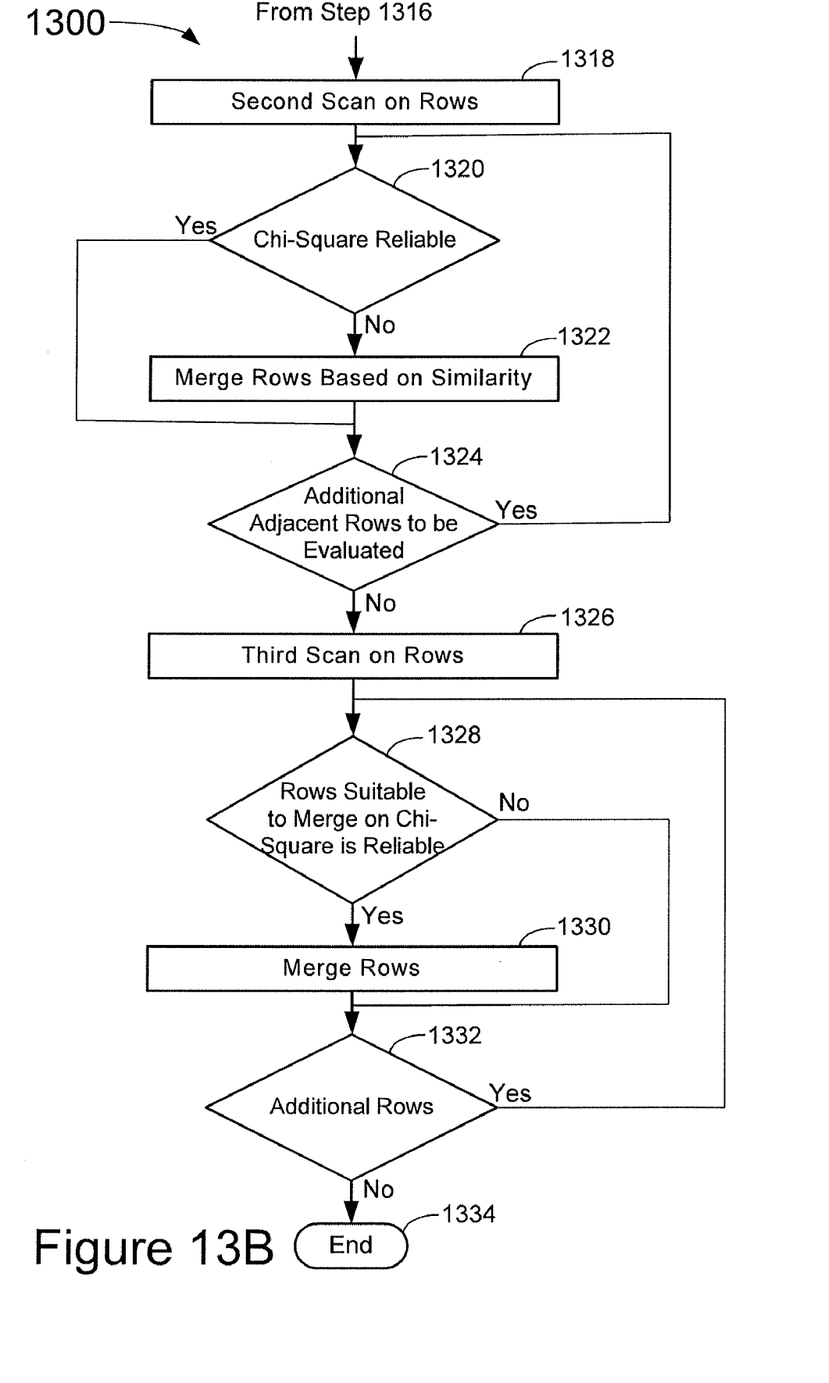

FIG. 13 is a flowchart 1300 that depicts processing of a value/interval merge table population routine implemented in accordance with an embodiment. The processing steps of FIG. 13 may be implemented as computer-executable instructions tangibly embodied on a computer-readable medium executable by a processing system, such as one or more of the processing nodes $105_1$-$105_Y$ depicted in FIG. 1.

The value/interval merge table population routine is invoked (step 1302), e.g., at step 1114 of FIG. 11, and minimum and maximum values (MinVal and MaxVal) of a row for an initial interval of the value/interval merge table 900 are initialized (step 1304). The initialization of minimum and maximum values of a row of the value/interval merge table 900 corresponds to a row attribute value to be discretized of the Contingency table 800. For example, a first row of the value/interval merge table 900 may have a minimum and maximum value of columns 920b-920c commonly set to the value of the Value column 820a of row 810a of the contingency table 800, e.g., "12020". An evaluation may then be made to determine if another interval remains to be initialized (step 1306). If so, the next minimum and maximum values of fields 920b-920c of the next row of the value/interval merge table 900 are then initialized to the next value to be discretized from the Contingency table 800 according to step 1304.

When no additional interval needs to be initialized for the value/interval merge table 900, table 900 is scanned once for a first operation of adjacent row merge procedures (step 1308). For instance, the frequencies of the attributes associated with the attribute to be discretized may be normalized (step 1310) as described above. An evaluation may then be made to determine if two adjacent rows are suitable to be merged (step 1312). For example, corresponding normalized frequencies of adjacent rows may be compared to determine if each of the corresponding frequencies are within a particular percentage, e.g., that specifies a tolerance for merging rows, of one another. If the corresponding frequency values of the adjacent rows are determined to be sufficiently within one another to merge the rows, the adjacent rows may then be merged into a single row (step 1314), and an evaluation may then be made to determine if additional adjacent rows remain to be evaluated (step 1316). If, at step 1312, the adjacent rows are not evaluated as suitable for merging, the routine may proceed to evaluate whether any additional adjacent rows remain to be evaluated for merging according to step 1316. If, at step 1316, additional adjacent rows remain for evaluation, the routine may return to step 1310 to normalize the adjacent rows.

When no additional rows remain to be evaluated for merging, the value/interval merge table population routine cycle may enter to a second scan of the value/interval merge table (step 1318), e.g., table 900 in the illustrative example provided herein. In the second scan, each row is evaluated to evaluate whether a reliable chi-square test may be performed on it with its neighbor rows (step 1320). If not, the evaluated row may then be merged to one of its two neighbors with the smaller cosine distance (step 1322).

In general, a cosine distance is used to measure the "similarity" of two vectors. Its value is between 0 and 1. A smaller cosine distance indicates two vectors are more similar to each other. A cosine distance of 0 indicates the two vectors are the same, and a cosine distance of 1 indicates the two vectors are far different from each other. A cosine distance threshold may be set for which two rows having a cosine distance below the threshold may be merged. Or simply, a row may be merged with one of its two neighbors with smaller cosine distance. The equation of cosine distance can be described as below if the vector has 3 dimensions:

$$\text{CosineDistance}\{a, b, c\},$$
$$\{x, y, z\} = 1 - \frac{ax + by + cz}{\sqrt{\text{abs}[a]^2 + \text{abs}[b]^2 + \text{abs}[c]^2} \sqrt{\text{abs}[x]^2 + \text{abs}[y]^2 + \text{abs}[z]^2}}$$

If a chi-square test may be performed between the currently evaluated row and one of its neighbors, the routine may then proceed to evaluate whether additional rows remain to be evaluated (step 1324). If so, the routine returns to evaluate whether chi-square testing is reliable according to step 1320. If no more additional rows remain to be evaluated, the routine may then enter a third scan of the value/interval merge table (step 1326), e.g., table 900 is the present example. In this scan, the chi-square tests are performed on each pair of adjacent rows. An evaluation may be made to determine if a pair of adjacent rows have a suitably small chi-square value for merging the rows (step 1328). If not, an evaluation may then be made to determine if an additional pair of adjacent rows remains to be evaluated (step 1332). If, at step 1328, a pair of adjacent rows with the smallest chi-square value are identified as suitable to merge, the rows are then merged into one new row (step 1330). In this instance, the two adjacent rows will be replaced by the new, merged row in the value/interval merge table (step 1330), e.g., table 900 in the continuing example. An evaluation may then be made to determine if additional adjacent rows remain for evaluation to determine if the adjacent rows have a chi-square value that is lower than a threshold which is selected according to the chi-square distribution of a specific freedom degree according to step 1332. If such rows remain, the process returns to evaluate whether the rows are suitable to merge according to step 1328. When no such rows remain for evaluation, the routine may then end (step 1334).

As described, chi-square routines are utilized which may produce better intervals than existing unsupervised discretization methods in an RDBMS. The described mechanisms provide an efficient, automatic, and repeatable way to perform discretization. Advantageously, human intervention is minimized. The disclosed routines provide for efficient processing of large and complex unknown data. Advantageously, data being analyzed is not moved and processed outside the database. The proposed mechanisms may use an External Stored Procedure to avoid multiple joins of large tables and minimize the number of full table scans and, consequently, provide better performance than contemporary mechanisms. The described system produces intermediate results in tables which may be conveyed to a visualization subsystem thereby providing users a better understanding of the data distribution in each category. Further, the disclosed system and method introduce a new similarity-based solution to merge intervals when chi-square testing is not reliable and thereby improves the quality of the interval merge process.

The flowcharts of FIGS. 11-13 depict process serialization to facilitate an understanding of disclosed embodiments and are not necessarily indicative of the serialization of the operations being performed. In various embodiments, the processing steps described in FIGS. 11-13 may be performed in varying order, and one or more depicted steps may be performed in parallel with other steps. Additionally, execution of some processing steps of FIGS. 11-13 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying aspects of the disclosed embodiments can be loaded onto a computer. The computer program is not limited to any particular embodiment, and may, for example, be implemented in an operating system, application program, foreground or background process, or any combination thereof, executing on a single processor or multiple processors. Additionally, various steps of embodiments may provide one or more data structures generated, produced, received, or otherwise implemented on a computer-readable medium, such as a memory.

Although disclosed embodiments have been illustrated in the accompanying drawings and described in the foregoing description, it will be understood that embodiments are not limited to the disclosed examples, but are capable of numerous rearrangements, modifications, and substitutions without departing from the disclosed embodiments as set forth and defined by the following claims. For example, the capabilities of the disclosed embodiments can be performed fully and/or partially by one or more of the blocks, modules, processors or memories. Also, these capabilities may be performed in the current manner or in a distributed manner and on, or via, any device able to provide and/or receive information. Still further, although depicted in a particular manner, a greater or lesser number of modules and connections can be utilized with the present disclosure in order to accomplish embodiments, to provide additional known features to present embodiments, and/or to make disclosed embodiments more efficient. Also, the information sent between various modules can be sent between the modules via at least one of a data network, an Internet Protocol network, a wireless source, and a wired source and via a plurality of protocols.

What is claimed is:

1. A method of performing database analytics that facilitates data discretization, comprising:
receiving, by a processing module, a query including a selection applied on a first attribute of a base table and a second attribute of the base table, wherein the first attribute comprises numeric values and the second attribute comprises a plurality of discrete values;
generating, by the processing module, a contingency table that includes a respective row having an attribute for each numeric value of the first attribute of the base table and a plurality of corresponding attributes for each respective discrete value of the second attribute of the base table, wherein each of the plurality of corresponding attributes store a count of a number of occurrences of one of the discrete values of the second attribute that are identified in a common row of the base table with the numeric value of the first attribute of the base table;
identifying adjacent rows of the contingency table suitable to be merged based on an evaluation of similarities between the plurality of corresponding attributes of the contingency table; and
assigning a discretized value to the numeric value of the contingency table.

2. The method of claim 1, further comprising generating, by the processing module, a summary table that includes a respective row having an attribute value that corresponds to the first attribute of the base table and a corresponding attribute that has a value of the second attribute of the base table.

3. The method of claim 2, wherein the summary table includes a frequency attribute in which a count of a number of instances of the value of the second attribute identified in a common row of the base table for the attribute value corresponding to the first attribute of the base table.

4. The method of claim 2, wherein the contingency table is generated from the summary table.

5. The method of claim 1, wherein the evaluation of the similarity between the plurality of corresponding attributes of the contingency table is performed by chi-square testing.

6. The method of claim 1, wherein a minimum value and a maximum value of the first attribute of the base table that is discretized are associated with the discretized value.

7. The method of claim 1, wherein assigning a discretized value to the numeric value of the contingency table comprises assigning a plurality of discretized values to respective numeric values of the contingency table.

8. A computer-readable medium having computer-executable instructions for execution by a processing system, the computer-executable instructions for performing database analytics that facilitate data discretization, the computer-executable instructions, when executed, cause the processing system to:
receive, by a processing module, a query including a selection applied on a first attribute of a base table and a second attribute of the base table, wherein the first attribute comprises numeric values and the second attribute comprises a plurality of discrete values;
generate, by the processing module, a contingency table that includes a respective row having an attribute for each numeric value of the first attribute of the base table and a plurality of corresponding attributes for each respective discrete value of the second attribute of the base table, wherein each of the plurality of corresponding attributes store a count of a number of occurrences of one of the discrete values of the second attribute that are identified in a common row of the base table with the numeric value of the first attribute of the base table;
identify, by the processing module, adjacent rows of the contingency table suitable to be merged based on an evaluation of similarities between the plurality of corresponding attributes of the contingency table; and
assign, by the processing module, a discretized value to the numeric value of the contingency table.

9. The computer-readable medium of claim 8, further comprising instructions that, when executed, cause the processing system to generate a summary table that includes a respective row having an attribute value that corresponds to the first attribute of the base table and a corresponding attribute that has a value of the second attribute of the base table.

10. The computer-readable medium of claim 9, wherein the summary table includes a frequency attribute in which a count of a number of instances of the value of the second attribute identified in a common row of the base table for the attribute value corresponding to the first attribute of the base table.

11. The computer-readable medium of claim 9, wherein the contingency table is generated from the summary table.

12. The computer-readable medium of claim 8, wherein the evaluation of the similarity between the plurality of corresponding attributes of the contingency table is performed by chi-square testing.

13. The computer-readable medium of claim 8, wherein a minimum value and a maximum value of the first attribute of the base table that is discretized are associated with the discretized value.

14. The computer-readable medium of claim 8, wherein the instructions that assign a discretized value to the numeric value of the contingency table comprise instructions that, when executed, cause the processing system to assign a plurality of discretized values to respective numeric values of the contingency table.

15. A computer system having a database management system configured to perform database analytics that facilitates data discretization, comprising:
 at least one storage medium on which the database management system and a base table is stored; and
 at least one processing module that receives a query including a selection applied on a first attribute of a base table and a second attribute of the base table, wherein the first attribute comprises numeric values and the second attribute comprises a plurality of discrete values, generates a contingency table that includes a respective row having an attribute for each numeric value of the first attribute of the base table and a plurality of corresponding attributes for each respective discrete value of the second attribute of the base table, wherein each of the plurality of corresponding attributes store a count of a number of occurrences of one of the discrete values of the second attribute that are identified in a common row of the base table with the numeric value of the first attribute of the base table, identifies adjacent rows of the contingency table suitable to be merged based on an evaluation of similarities between the plurality of corresponding attributes of the contingency table, and assigns a discretized value to the numeric value of the contingency table.

16. The system of claim 15, wherein the processing module generates a summary table that includes a respective row having an attribute value that corresponds to the first attribute of the base table and a corresponding attribute that has a value of the second attribute of the base table.

17. The system of claim 16, wherein the summary table includes a frequency attribute in which a count of a number of instances of the value of the second attribute identified in a common row of the base table for the attribute value corresponding to the first attribute of the base table.

18. The system of claim 16, wherein the contingency table is generated from the summary table.

19. The system of claim 15, wherein the evaluation of the similarity between the plurality of corresponding attributes of the contingency table is performed by chi-square testing.

20. The system of claim 15, wherein a minimum value and a maximum value of the first attribute of the base table that is discretized are associated with the discretized value.

* * * * *